W. H. TILLEY.
ANIMAL TRAP.
APPLICATION FILED APR. 17, 1911.
1,017,605.
Patented Feb. 13, 1912.
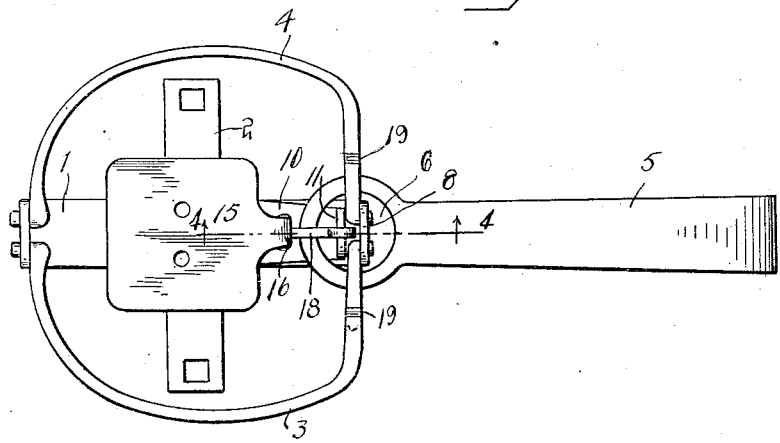
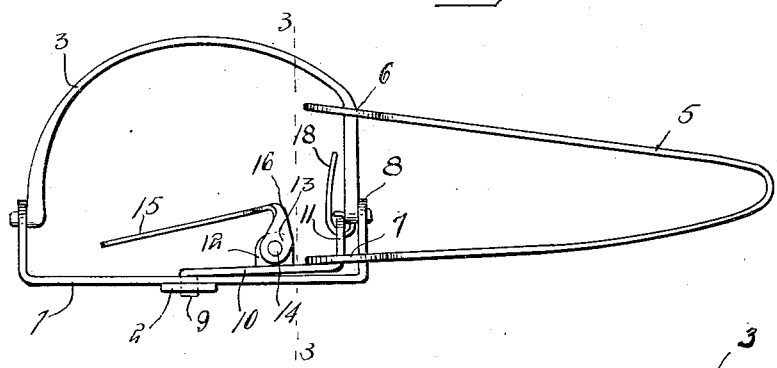
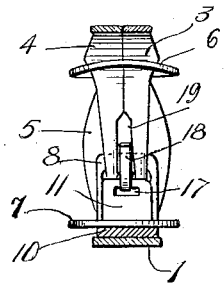
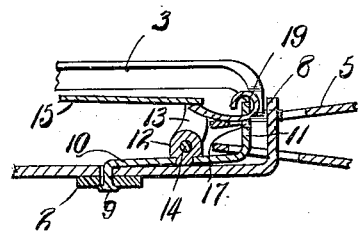
Inventor
W. H. Tilley

UNITED STATES PATENT OFFICE.

WILLIAM H. TILLEY, OF WILLOWRANCH, CALIFORNIA.

ANIMAL-TRAP.

1,017,605.  Specification of Letters Patent.  Patented Feb. 13, 1912.

Application filed April 17, 1911. Serial No. 621,632.

*To all whom it may concern:*

Be it known that I, WILLIAM H. TILLEY, a citizen of the United States, residing at Willowranch, in the county of Modoc, State of California, have invented certain new and useful Improvements in Animal-Traps; and I do hereby declare the following to be a full, clear, and exact description of the invention, such as will enable others skilled in the art to which it appertains to make and use the same.

My invention relates to new and useful improvements in animal traps, and more especially to that class known as jaw traps and the object of my invention is to improve the construction and increase the efficiency of traps of that character.

A further object of my invention is to improve the trip mechanism of the trap, by pivoting the trigger and trip upon an auxiliary base portion, thus relieving the jaw holding portion of the base of all unnecessary strain and at the same time strengthening the same.

A further object of my invention is to provide means by which the trigger is prevented from becoming caught by the jaws of the trap, thus insuring a perfect closure of the jaws.

With these and other objects in view my invention will be more fully described, illustrated in the accompanying drawings which show a preferred embodiment of my trap and then specifically pointed out in the claim which is attached to and forms a part of this application.

In the drawings, Figure 1 is a top plan of the trap, showing the same in operative position. Fig. 2 is a side elevation of the trap in its closed position. Fig. 3 is a vertical section through the line 3—3 of Fig. 2. Fig. 4 is a fragmentary sectional view in detail on the line 4—4 of Fig. 1.

Referring more specifically to the drawings in which similar reference numerals designate corresponding parts throughout, my trap will be seen to follow in general the customary construction of traps of a similar type, my chief invention residing in the specific trip releasing mechanism which I have provided.

The base of my trap consists primarily of the elongated U-shaped member 1 and the transverse member 2 secured thereto, said latter member serving to prevent the trap from tipping sidewise and so closing the jaws. The upper end of the U-shaped member is provided with the customary apertures in which are swingingly secured the usual form of jaws 3 and 4, adapted to be normally held in closed position by the spring 5, which is secured to the trap in the customary manner by means of their apertures 6 and 7, through the former of which is extended one end of each of the jaws 3 and 4, while the latter aperture 7, is passed over the upwardly extending portion 8 of the base member 1.

Secured to the base member 1, by the same bolt or rivet 9, which secures the members 1 and 2 together is an L-shaped member 10 the upwardly extending end 11 of which is passed through the aperture 7 of the spring 5 and is spaced at a slight distance from the portion 8 of the base member 1. Intermediate the length of this member 10 and formed either integrally with said member or secured thereto by any preferred means is the upwardly extending ear 12 and swingingly connected thereto by means of the spaced apart ears 13 and the bolt or rivet 14 is the trip 15 of the trap. These ears 13 are formed integrally with the trip 15, the body portion of which is extended backwardly between the ears as shown at 16 to form a catch for the trigger as will be hereinafter more fully explained. The upwardly extending portion 11 of the arm 10 is provided adjacent its upper edge with an aperture 17, as best shown in Fig. 3 and pivoted thereby, by means of bending its end around that portion of the member 11 between its terminal and the aperture 17 is the trigger 18.

In operation the trap is set in the customary manner the upper arm of the spring 5 being bent downwardly until the apertured portion 6 rests upon the apertured portion 7 of the lower arm, the apertures 6 and 7 both surrounding the upwardly extending portions 8 and 11 of the base members, the trigger is then placed in engagement with the catch member 16 of the trip 15, when the tension is released, the spring being held in its distorted position entirely by the trigger 18. By this construction the jaws may be either in the position shown in Fig. 1, or in the position shown in Fig. 2 while the trap is being set.

In order to prevent the trigger from interfering with the closing of the jaws by flying back between the same, the lower inner portion of each of the jaws adjacent the trigger end thereof is recessed as at 19, thus allowing sufficient space for the trigger to pass freely between the jaws when in their closed position.

It will be seen from the above that I have constructed a trap possessing marked advantages over the customary form, in that the trip mechanism is entirely independent of the jaws, thus permitting the latter to be placed in any desired position while the trap is set.

A still further advantage resides in the fact that by pivoting the trigger to the member 11 as I have, all unnecessary strain is removed from the base proper of the trap, and that also by including this member 11 within the loop 7 of the spring all strain upon the member 8 of the base, caused by the animal's struggles to free itself is taken up by the member 11, thus avoiding all danger of bending the member 8 outwardly and thus releasing the jaws, which often occurs when an animal too large for the strength of trap used is caught. Furthermore the position of the loop 7 about the member 11 serves as a securing means for that end of the member 10, thus avoiding unnecessary expense in constructing.

What I claim is:—

A trap of the character described, comprising a base having upwardly directed terminals, a second base member secured thereto and having an upwardly directed terminal parallel to and spaced apart from one of the first mentioned terminals, a U-shaped spring provided with apertured end portions, one of said end portions being seated over said spaced apart terminals, a trip pivotally secured to the second base member, a trigger pivoted to the upwardly directed terminal of said latter member and adapted to co-act with said trip and spring to maintain the latter in compressed position, and jaws swingingly mounted in the terminals of said first mentioned base member, one end of each of said jaws being passed through the aperture of the other end portion of the spring, the inner edges of said jaws adjacent one end thereof being provided with recesses adapted to receive the trigger when the trip is released.

In testimony whereof, I affix my signature, in presence of two witnesses.

WILLIAM H. TILLEY.

Witnesses:
   J. S. LOFFER,
   B. L. GILLETT.

---

Copies of this patent may be obtained for five cents each, by addressing the "Commissioner of Patents, Washington, D. C."